Oct. 19, 1965 J. N. REID 3,213,291

VARIABLE IMPEDANCE CONTROLLED PHASE SHIFTER USING SQUARING TRANSISTOR WITH SWITCHING LEVEL THEREOF ALSO CONTROLLED BY VARIABLE IMPEDANCE

Filed Sept. 1, 1960

Inventor
J. N. REID
By Robert B. Harmon
Attorney

United States Patent Office 3,213,291
Patented Oct. 19, 1965

3,213,291

VARIABLE IMPEDANCE CONTROLLED PHASE SHIFTER USING SQUARING TRANSISTOR WITH SWITCHING LEVEL THEREOF ALSO CONTROLLED BY VARIABLE IMPEDANCE

John N. Reid, Belleville, Ontario, Canada, assignor to Northern Electric Company, Limited, Montreal, Quebec, Canada, a corporation of Canada Filed Sept. 1, 1960, Ser. No. 53,534
3 Claims. (Cl. 307—88.5)

This invention relates to phase shifting network and more particularly to electronic circuits for shifting the phase of alternating sinusoidal potentials.

Well known basic phase shifting circuits allow an adjustable phase shift of somewhat less than 180 electrical degrees or somewhat less than 360 electrical degrees and therefore have the inherent difficulty of not permitting a continuously adjustable phase shift from 0 to 360 electrical degrees.

It is the primary object of this invention to provide a new phase shifting network in which the output voltage can be continuously varied through more than 360 electrical degrees relative to the input voltage, the output voltage remaining constant in magnitude.

In accordance with this invention the phase shift capable of being produced by a basic phase shifting circuit is increased to a range from 0 to more than 180 electrical degrees or to a range from 180 to more than 360 electrical degrees by providing a phase shift circuit whose output signal is adjustable in phase relation to the input signal, the output of which is directly applied to the input of a single stage transistor squaring amplifier so that the biasing or switching point of the amplifier is varied, giving a vectorial phase difference between the input and output signal voltage of the transistor, the amount of phase difference being determined by the adjustment of the output impedance of the phase shift network.

Figure 1:
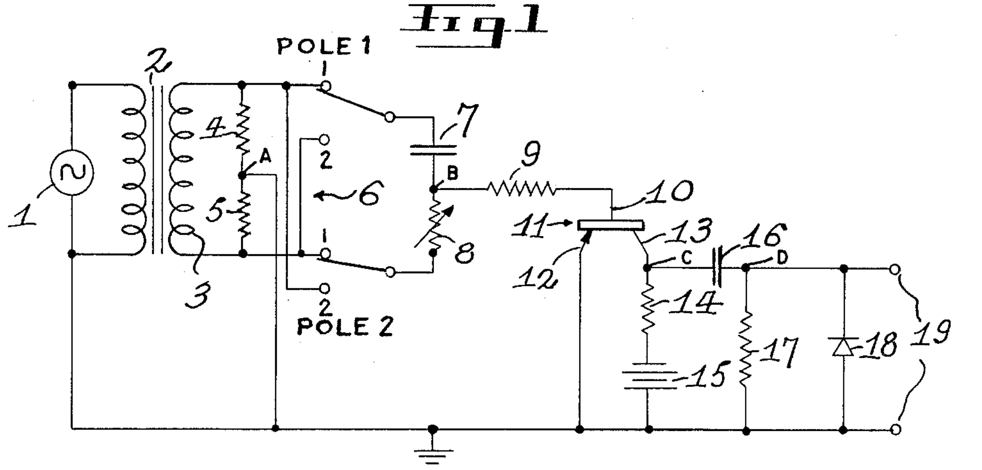
Figure 2:
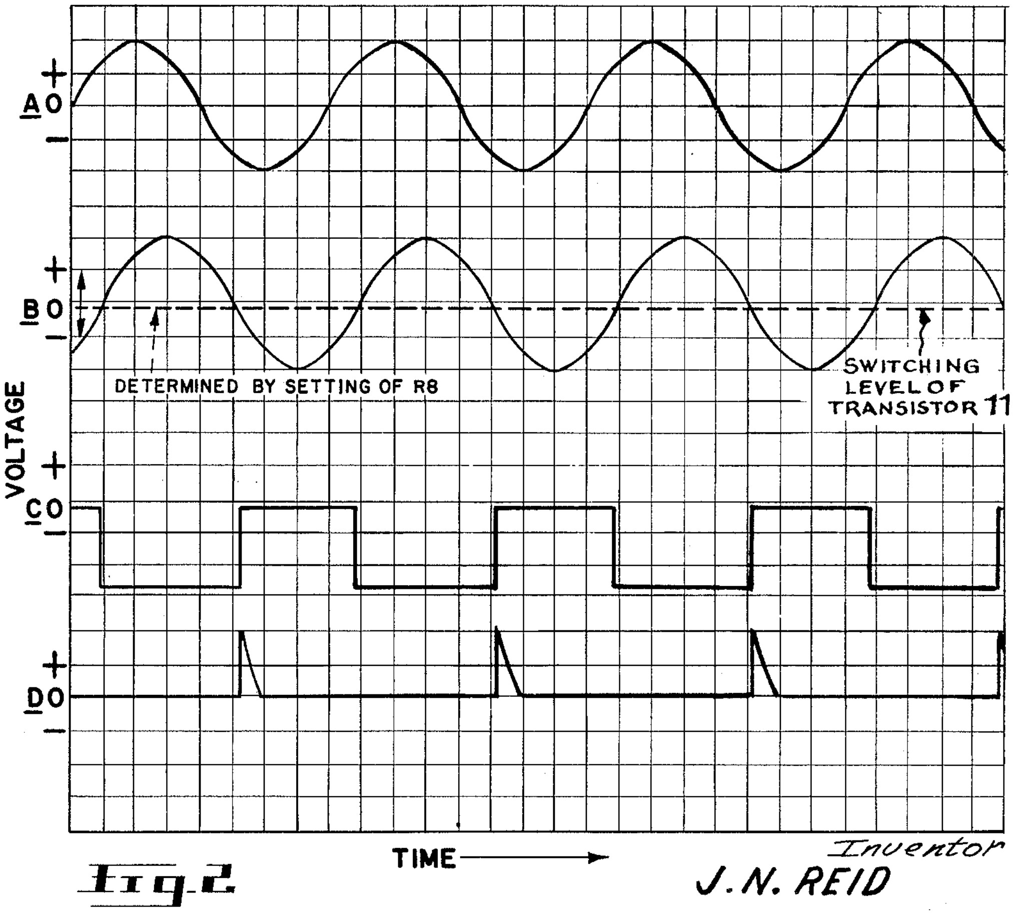

Other objects and advantages of this invention will become apparent by referring to the following detailed description, when read in view of the accompanying drawings, in which:

FIG. 1 is a phase shifting network embodying the principles of the invention, and FIG. 2 shows typical curves A, B, C, and D graphically illustrating the relative phase of the waveforms with respect to time at successive stages of the network of FIG. 1.

Referring to the drawings, there is shown in FIG. 1 a source of alternating voltage 1, which can be an unbalanced 60 cycle 117 volt alternating current, applied through an isolating transformer 2 having a secondary winding 3 across which is connected a resistive voltage divider consisting of two equal resistors of small value 4 and 5 having a grounded center point. The resistors 4 and 5 are required only to provide an artificial center tap on the transformer 2, the same result of course can be achieved by providing a transformer having a secondary winding with a grounded center tap. If the signal input is balanced, then no transformer is required and only the resistive voltage divider is required.

The output from secondary winding 3 is connected through a double-pole, double-throw switch 6 to a conventional phase shifting circuit consisting of capacitor 7 and variable resistor 8. A reactive element such as an inductor may be substituted for capacitor 7, the essential requirement being that the reactive element chosen has a characteristic in phase quadrature with resistor 8.

In order to achieve a phase reversal to the phase shifting circuit when required, switch 6 is connected as follows:

Contact 1, pole 1, is connected to contact 2, pole 2, and contact 2, pole 1, is connected to contact 1, pole 2.

The junction of capacitor 7 and resistor 8 is connected through resistor 9 to the base 10 of transistor 11, having emitter 12 connected to ground and collector 13 connected through its load resistor 14 to a negative power supply potential 15. The transistor 11 as shown can be a single stage grounded emitter amplifier of the PNP type. Collector load resistor 14 should be sufficiently large to permit squaring of the input sinusoidal. Transistor 11 of course can be of the NPN type in which case the power supply potential 15 connected to resistor 14 would be positive. The transistor can also be used in the grounded base connection with resistor 9 connected to the emitter 12, the base 10 connected to ground, the collector 13 being connected as before.

Also shown in FIG. 1 is a differentiating circuit consisting of capacitor 16 and resistor 17, serially connected between the junction of collector 13 and resistor 14 to ground. A clipping diode 18 is connected in its backward direction between the junction of capacitor 16 and resistor 17 to ground to remove any negative going output from the differentiating circuit. A signal output 19 is connected between the junction of capacitor 16, resistor 17, diode 18 and ground.

In order to achieve as near to 180 electrical degrees or to 360 electrical degrees phase shift as practicable in the basic phase shift circuit the maximum resistance value of resistor 8 in ohms should be equal to or greater than:

$$\frac{10}{\text{Capacitance of capacitor 7 in farads} \times \omega}$$

where $\omega=2\pi f$ and $f$=frequency in c.p.s., and equal to or greater than 5×resistance of resistor 9. The voltage at the output of the basic phase shift circuit should be at least 1 or 2 volts, that is, sufficient to cause saturation of transistor 11.

The operation of the invention can be best understood by referring to FIG. 1 and to the wave forms of FIG. 2. When a source of alternating voltage 1 represented by FIG. 2A is applied to the input of the circuit and switch 6 is in position 1, the voltage taken from between the junction of capacitor 7 and resistor 8 and the grounded center point of resistors 4 and 5 can be continuously shifted in phase relative to the input voltage over nearly 180 electrical degrees by the adjustment of resistor 8 from its minimum to its maximum value. This phase shifted voltage is represented by FIG. 2B.

For transistor 11 to conduct, the potential at base 10 must be negative with respect to the potential at emitter 12. Since the effective overall internal impedance of the source of voltage which turns transistor 11 on and off includes variable resistor 8, an adjustment of the resistance presented by resistor 8 changes such overall internal impedance. Consequently, since transistors are essentially current responsive devices, the voltage level at which transistor 11 changes state may be controlled by a change in the resistive value of resistor 8. The switching level of transistor 11 for a typical value of resistor 8 is also represented by FIG. 2B. As shown the setting of resistor 8 will determine over a small range, where in the cycle the transistor 11 is switched from its nonconductive to its conductive state and vice versa. When resistor 8 is at its minimum value transistor 11 starts to conduct when the signal of FIG. 2B is a very small amount negative. When resistor 8 is at its maximum value, transistor 11 starts to conduct when the signal of FIG. 2B is a larger amount negative, approximately five times the amount when resistor 8 is at its minimum. Thus pursuant to an increase in the resistance of resistor 8, the effective overall internal impedance of the source viewed between base 10 and emitter 12 is increased and the critical negative voltage, at the junction of resistor 8 and secondary winding 3, required to change the state of transistor 11 is increased negatively. The negative movement of the switching point of transistor 11 produces an additional phase shift at the output of transistor 11 which allows the positive going edge of waveform C to shift in phase over somewhat greater than 180 electrical degrees relative to waveform A while waveform B is shifting in phase over less than 180 electrical degrees relative to waveform A.

For the values of the components given herein, the range of additional phase shift is approximately 0–20 electrical degrees. Therefore the phase shift capable of being produced by this invention with switch 6 in position 1 is 0 to nearly 200 electrical degrees. With switch 6 in position 2, the source of alternating voltage 1 applied to the phase shift network is reversed in phase and at waveform C a phase shift of 180 to nearly 380 electrical degrees can be achieved. The overlap of phase shift produced between positions 1 and 2 of switch 6 permits a continously variable phase shift from 0 to more than 360 electrical degrees by the adjustment of resistor 8.

The duty cycle of the square wave at the output of transistor 11 as represented by waveform C is determined by the setting of resistor 8. The larger the value of resistor 8 the more negative will be the average value of the square wave. The differentiating circuit consisting of capacitor 16 and resistor 17 operates on the positive and negative going edges of the square wave shown in FIG. 2C and in conjunction with clipping diode 18 produces an output pulse train represented by FIG. 2D which is capable of being continuously variable in phase relative to the input sinusoidal voltage represented by FIG. 2A. The waveform of FIG. 2D shifted in phase relative to the waveform of FIG. 2A can then be utilized as required to start other operations at any desired time in a cycle of the waveform of FIG. 2A.

For an input sinusoidal signal having a frequency of 60 cycles the following are typical component values found to be suitable;

| | |
|---|---|
| Line voltage (volts) | 117 |
| Transformer (volts stepdown) | 117:7.5 |
| Capacitor 7 ______ microfarad | 1 |
| Capacitor 16 ______ do | 0.05 |
| Resistor 8 | 50K |
| Resistor 9, 14, 17 | 10K |
| Resistor 4 and 5 ______ ohms | 39 |

Although a particular basic phase shifting circuit is described in this embodiment it should be understood that other phase shifting circuits can be used with this invention which are designed to provide a continuous phase shift up to nearly 180 or to nearly 360 electrical degrees providing that sufficient output voltage from the phase shifter can be maintained, that is a few volts, and provided that means are available to vary the output impedance of the phase shifter as is characteristic of the phase shifter used in this invention.

What is claimed is:

1. A phase shifting network comprising: input connecting terminals, output connecting terminals, a phase shifting circuit, a switching circuit, a transistor amplifier included in said switching circuit, and a variable resistor included in said phase shifting circuit, said phase shifting circuit being connected between said input connecting terminals and said switching circuit, said switching circuit being connected between said phase shifting circuit and said output terminals, said phase shifting circuit being responsive to a source of alternating electrical energy applied to said input terminals through said phase shifting circuit including said variable resistor to provide a voltage input signal phase shifted from the energy of said source and applied to said transistor amplifier, said transistor amplifier being biased to establish a square wave output signal for application to said output terminals, said variable resistor being connected from within said phase shifting circuit to said transistor amplifier within said switching circuit to control the phase of said input voltage over a predetermined range applied to said transistor amplifier, and also to control the voltage level at which said transistor amplifier conducts, thereby establishing an additional phase shift of said square wave output signal with respect to said voltage applied to said transistor amplifier.

2. The phase shifting network according to claim 1 wherein said switching circuit is provided with a differentiating circuit connected between said transistor amplifier and said output connecting terminals.

3. The phase shifting network according to claim 2 wherein said switching circuit is provided with a diode connected between said differentiating circuit and said output connecting terminals, said diode being connected across said differentiating circuit and across said output connecting terminals to clip differentiated pulses of one polarity excursion obtained from said differentiating circuit.

References Cited by the Examiner

UNITED STATES PATENTS

| | | | |
|---|---|---|---|
| 2,171,536 | 9/39 | Bingley | 328—155 X |
| 2,230,926 | 2/41 | Bingley | 328—155 |
| 2,434,904 | 1/48 | Busignies | 328—155 |
| 2,483,403 | 10/49 | De Rose | 328—155 X |
| 2,831,108 | 4/58 | Barditch | 328—24 |
| 2,900,534 | 8/59 | Chater | 307—88.5 |

ARTHUR GAUSS, *Primary Examiner.*

HERMAN KARL SAALBACH, JOHN W. HUCKERT, *Examiners.*